United States Patent [19]

Bexten et al.

[11] 4,160,490

[45] Jul. 10, 1979

[54] AUXILIARY STEERING SYSTEM

[75] Inventors: Eugen Bexten, Ancaster; Robert W. Logue, Hamilton; Ken J. Wiebe, Dundas, all of Canada

[73] Assignee: International Harvester Company, Chicago, Ill.

[21] Appl. No.: 804,973

[22] Filed: Jun. 9, 1977

[51] Int. Cl.² ............................................. B62D 5/08
[52] U.S. Cl. ..................................... 180/133; 60/405; 188/5
[58] Field of Search .................. 180/133, 9.2; 60/405, 60/404; 172/801; 188/5, 6, 7

[56] References Cited

U.S. PATENT DOCUMENTS

| 2,233,994 | 3/1941 | Cook | 188/6 X |
|---|---|---|---|
| 3,407,894 | 10/1968 | Thompson et al. | 60/405 |
| 3,747,725 | 7/1973 | Feustel et al. | 180/133 |
| 3,847,243 | 11/1974 | Barth | 180/133 |
| 3,994,352 | 11/1976 | Siorek | 180/9.2 R |

Primary Examiner—John A. Pekar
Attorney, Agent, or Firm—Ronald C. Kamp; F. David AuBuchon

[57] ABSTRACT

An economical and effective auxiliary steering system for a vehicle having a relatively low maximum speed in reverse direction. A ground driven pump having an output when the vehicle is going forward is directed to a diverter valve, which valve is responsive to loss of hydraulic pressure in the main steering circuit to direct the said output to the main steering valve. A single spring loaded check valve isolates the main steering valve under auxiliary steering conditions.

2 Claims, 2 Drawing Figures

AUXILIARY STEERING SYSTEM

BACKGROUND & SUMMARY OF THE INVENTION

The braking distance and time required to stop a moving vehicle are related to the kinetic energy of the vehicle at the moment the brakes are first applied; the brakes being simply devices for converting the kinetic energy into heat. The kinetic energy is a function of the vehicle mass and the square of the vehicle velocity. Since velocity is squared, a doubling of the vehicle speed results in a four-fold increase in the energy that must be converted to heat by the brakes, holding the mass constant, while doubling the mass, holding the velocity constant, will merely double the kinetic energy. Obviously then, it will require a greater time, and hence a greater distance, to bring a vehicle to a stop, everything else being equal, if the vehicle is traveling at a greater speed; the important factor being that the braking distance to speed relationship is not a straight line but a curve of the second order.

Log skidders, because of their mass and the rough terrain over which they customarily operate, are usually provided with some form of hydraulic assist for the steering. An engine failure or other loss of hydraulic fluid pressure results in loss of the hydraulic assist for the steering. In order to compensate for this possibility, log skidders have been provided with various forms of auxiliary steering. Since most log skidders have transmissions with speed ratios in both forward and reverse which are substantially equal, it is possible to attain top speeds in either direction which are substantially equal and relatively high. With speed being the more important criterion in determining braking distance, it is necessary to provide auxiliary steering in such vehicles in either direction. However, if the vehicle has a transmission ratio in one direction, preferrably reverse as a practical matter, which limits the top speed attainable in that direction to a relatively low speed, the vehicle can be stopped in a short distance without the need for an auxiliary steering arrangement that provides steering assist in that direction.

It is, therefore, an object of this invention to provide an auxiliary steering system which is simple, relatively inexpensive and capable of installation in a vehicle with relative ease.

It is also an object of this invention to provide a vehicle having high top speeds in only one direction with such an auxiliary steering system when the vehicle is traveling in that direction.

These and other objects of the present invention, and many of the attendent advantages thereof, will become more readily apparent upon a perusal of the following description of a perferred embodiment and the accompanying drawings, wherein;

FIG. 1 is a side elevational view of a vehicle incorporating the present invention; and, FIG. 2 is a schematic circuit diagram utilized in the vehicle of FIG. 1.

DESCRIPTION OF A PREFERRED EMBODIMENT

Figure 1:
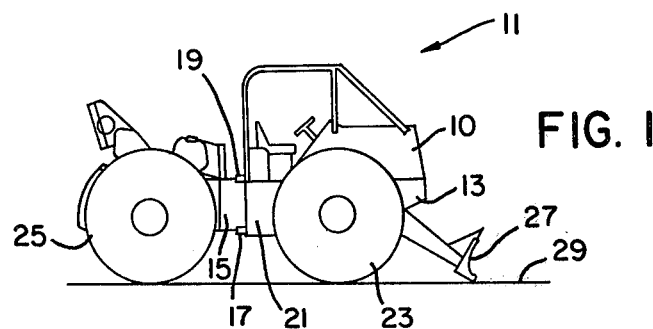

Referring to FIG. 1, a vehicle 11, such as a log skidder, has front and rear frames 13 and 15 respectively, which frames are hinged together at 17 and 19 to permit steering of the vehicle by articulation of the frames. Frames 13 and 15 are provided with wheeled axles, 23 and 25 respectively, driven by an engine 10 through a forward-reverse transmission 21 which has gear ratios permitting relatively high speeds in forward direction and relatively low speed in reverse direction of travel. A dozer blade 27 is pivotally supported on the front frame 13 and is capable of being raised from, and lowered into, contact with the ground, indicated at 29.

Figure 2:
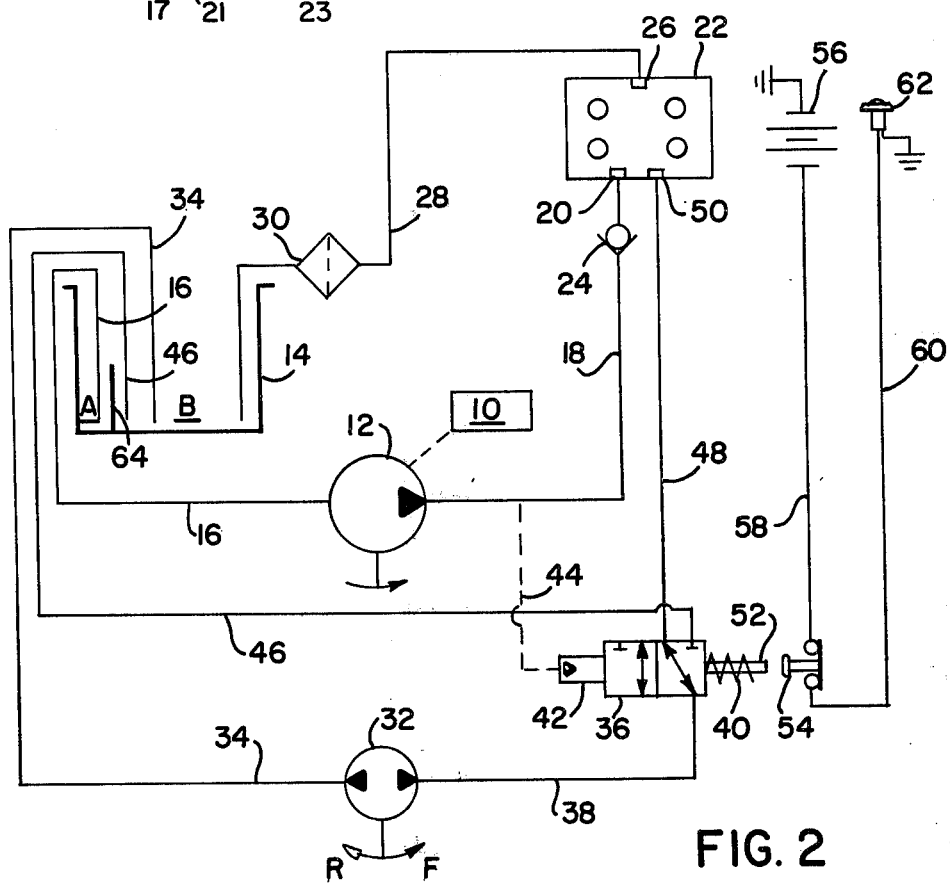

Referring now to FIG. 2, the vehicle prime mover or engine 10, when operating, drives a main hydraulic pump 12 which draws hydraulic fluid from reservoir 14 through conduit 16 and supplies hydraulic fluid under pressure through line or conduit 18 to the inlet port 20 of the hydraulic steering valve 22. A spring-loaded check valve 24 is provided in the conduit 18, which check valve permits flow of hydraulic fluid from the pump 12 to the valve 22, while preventing such flow in the opposite direction if the pressure on the pump side drops below a predetermined value, such as 40 psi., for example. The steering valve 22, in response to movement of the vehicle's steering wheel, supplies hydraulic fluid under pressure to the steering cylinders by conventional and well-known means. As shown in the drawing, the excess fluid, and the fluid returned or exhausted from the steering cylinders, exits from exhaust port 26 of valve 22, which type of valve is commonly called an open-center type, and is returned to the reservoir 14 through conduit 28. A filter 30 is interposed in conduit 28 to remove contaminates from the hydraulic fluid. It is to be understood that the vehicle, a log skidder such as shown in U.S. Pat. No. 3,543,867 issued Dec. 1, 1970, for example, is provided with hydraulically actuated equipment, such as a dozer blade, which may also receive hydraulic fluid under pressure from the main pump 12. Since such an arrangement is old and well-known in the art, details of that portion of the hydraulic circuit have been omitted from the drawing.

A reversible ground driven pump 32, which for convenience may be mounted to and driven by the output side of the vehicle transmission, is in communication with the reservoir 14 through conduit 34 and with a diverter valve 36 by means of conduit 38. The diverter valve 36 is a two-position, three port valve which is biased by means of compression spring 40 toward the left, which is the position shown in the drawing. However, a pressure actuator 42 is connected to diverter valve 36 and receives fluid pressure from conduit 18 by means of pilot line 44. When hydraulic pressure is present in conduit 18, as will normally be the case when the engine 10 is operating, the bias of spring 40 will be overcome, permitting the actuator 42 to shift the diverter valve 36 to the right, as viewed in the drawing. When so shifted, the valve 36 will permit communication between conduit 38 and a conduit 46 which also communicates with the reservoir 14, while blocking a conduit 48 which leads from valve 36 to a inlet port 50 of the steering valve 22. Under these circumstances, the pump 32 will draw hydraulic fluid from the reservoir 14 through conduit 34 and discharge it to reservoir 14 through conduits 38, diverter valve 36 and conduit 46, when the vehicle is traveling in a forward direction. When the vehicle is traveling in a reverse direction, hydraulic fluid is drawn from the reservoir 14 through conduits 46, diverter valve 36 and conduit 38 and is discharged by the pump 32 to the reservoir through conduit 34.

In case of a failure of the engine 10, the pump 12 or of the hydraulic conduit 18, hydraulic power to the steering valve 22 will be lost. The resulting drop in hydraulic pressure in conduit 18 will be transmitted to the actuator 42 through pilot line 44. When the pressure drops to a predetermined level, such as below 40 psi for example, the force of spring 40 will cause the diverter valve 36 to be shifted to the position shown in the drawings. In this position, the diverter valve 22 blocks conduit 46, while connecting the conduit 38 with conduit 48, which latter conduit is connected with second inlet port 50 on the steering valve 22. The second inlet port 50 is in communication with the inlet port 20, internally of the valve 22, and if the vehicle is traveling in a forward direction, the steering valve 22 receives hydraulic fluid pressure from the pump 32 to actuate the steering cylinders in response to movement of the steering wheel in the same manner as it normally does in receiving hydraulic fluid from the pump 12. While the response in substantially the same, it is to be recognized that the capacity of pump 32 will probably be of less capacity than the pump 12 and, in that case, the steering speed may be slower. The check valve 24 isolates the valve 22 so that all of the output from pump 32 is available for steering.

If one of the aforementioned failures should occur while the vehicle is traveling in a reverse direction, the output from pump 32 will be into conduit 34 which leads back to the reservoir 14. In such a condition, no hydraulic pressure will be available to the steering valve 22 and hence, no hydraulic assist will be provided for steering. However, the top speed attainable in reverse gear is relatively low and the operator can drop the dozer blade onto the ground to safely stop the machine relatively quickly and within a short distance. It is significant to note that the blade is provided on the front end of the log skidder. Hence, with the vehicle traveling in reverse, dropping the blade to stop the machine can be done with relative safety because the braking force is applied to the rear end of the machine relative to its direction of travel. This is especially important with machines that steer by articulation of the frame, as log skidders do.

While failure of the engine would most likely be noticed by the operator immediately, failure of the pump or a hydraulic conduit may not be so readily capable of determination. It is therefore desirable to inform the operator immediately whenever normal hydraulic assisted steering has been lost. Movement of the diverter valve 36 is utilized to actuate an indicator for the operator. A rod 52 is affixed to the diverter valve 36 and extends axially outward therefrom. A normally closed electrical switch 54 is positioned to be contacted and opened by the rod 52 when the valve 36 is shifted to the right by the hydraulic actuator 42. When the valve 36 is shifted to the postion shown under the influence of spring 40, the switch 54 will be closed. One terminal of the switch is connected to a grounded source of electrical energy 56, such as the vehicle's battery, by conductor 58 and the other terminal to a grounded indicator 60, such as a light or horn, by conductor 62. Hence, the electrical circuit will be complete and the indicator 60 actuated whenever there is insufficient pressure in conduit 18 to overcome the force of spring 40.

A failure of the pump 12 or the conduit 18 may permit loss of large quantities of hydraulic fluid from the system. Since it is essential that the system retain a sufficient quantity of fluid to permit pump 32 to supply the steering circuit, the reservoir 14 is provided with a baffle 64 which divides the reservoir into two compartments A and B. Suction line or conduit 16 for the main pump 12 communicates with one compartment A, while the return conduit 28 and the conduits 34 and 46 all communicate with the other compartment B. The height of the baffle 64 is sufficient to define that volume of fluids in compartment B which is necessary to permit proper auxiliary steering with pump 32. Since the return conduit 28 discharges into compartment B, compartment A receives fluid only when compartment B has received that volume necessary for proper auxiliary steering. In other words, pump 12 can discharge hydraulic fluid outside the system, due to a failure, but is prevented from reducing the volume of fluid in compartment B of the reservoir below that required for proper auxiliary steering. The above described preferred embodiment provides a simple and economical auxiliary steering system. Various other embodiments and alterations will be apparent to those skilled in the art and may be made without departing from the spirit and scope of the following claims.

We claim:

1. In a log-skidder machine having front and rear frame portions hinged together about a vertical axis for articulated steering, a dozer blade mounted on the front frame and capable of being raised and lowered, and a transmission with gear ratios which permit relatively high speeds in forward and relatively low speeds in reverse; an improved steering system comprising:

a normal steering circuit including a reservoir, a main pump, a check valve and a steering valve connected in series;

a first conduit connecting said steering valve to said reservoir;

a ground-driven pump capable of fluid output in either direction of rotation;

a forward-suction, reverse-output conduit connecting said ground-driven pump and said reservoir;

a diverter valve having three ports and capable of being moved to two positions;

a second conduit connecting the ground-driven pump and diverter valve;

a third conduit connecting the diverter valve and the reservoir;

a fourth conduit connecting the diverter valve and the steering valve;

bias means urging the diverter valve to one of its two positions wherein the second and fourth conduits are in communication and the third conduit is blocked;

actuator means responsive to fluid pressure output from said main pump to shift the diverter valve to the other of its two positions wherein the second and third conduits are in communication and the fourth conduit is blocked;

whereby said actuator means normally holds said diverter valve in its said other position and said second, third and forward-suction, reverse-output conduits form a closed path between said ground-driven pump and reservoir for travel in both forward and reverse directions; and loss of pressure to said actuator means permits said bias means to shift said diverter valve to its said one position so that travel in a forward direction will permit the ground-driven pump to supply fluid pressure to said steering valve and travel in a reverse direction can be controlled by lowering said blade to the ground.

2. The invention according to claim 1 and further comprising:

a sensory indicator actuated in response to movement of said diverter valve to said one position.

* * * * *